United States Patent
Matsunaga et al.

(10) Patent No.: US 7,063,552 B2
(45) Date of Patent: Jun. 20, 2006

(54) THIN-PROFILE CONNECTOR HAVING A COVER WHICH CAN BE READILY OPERATED AND RELIABLY LOCKED IN A CLOSED STATE

(75) Inventors: Akihiro Matsunaga, Tachikawa (JP); Akira Natori, Fussa (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 10/662,898

(22) Filed: Sep. 15, 2003

(65) Prior Publication Data
US 2004/0067673 A1 Apr. 8, 2004

(30) Foreign Application Priority Data
Sep. 17, 2002 (JP) ..................... 2002-269675

(51) Int. Cl.
*H01R 13/62* (2006.01)

(52) U.S. Cl. ..................... 439/326; 439/331
(58) Field of Classification Search ............... 439/326, 439/331, 630, 327–330, 72, 73, 260, 157, 439/631; 235/441, 475, 479, 482
See application file for complete search history.

(56) References Cited

U.S. PATENT DOCUMENTS

| 5,226,826 | A | * | 7/1993 | Nillson et al. ............. 439/72 |
| 5,603,629 | A | * | 2/1997 | DeFrasne et al. .......... 439/331 |
| 5,813,878 | A | * | 9/1998 | Kuwata et al. ............ 439/326 |
| 6,149,466 | A | * | 11/2000 | Bricaud et al. ............ 439/630 |
| 6,176,721 | B1 | * | 1/2001 | Gottardo et al. ........... 439/260 |
| 6,220,882 | B1 | * | 4/2001 | Simmel et al. ............ 439/326 |
| 6,231,365 | B1 | * | 5/2001 | Konno et al. ............. 439/331 |
| 6,273,739 | B1 | * | 8/2001 | Konno et al. ............. 439/331 |
| 6,319,036 | B1 | | 11/2001 | Zheng et al. |
| 6,663,408 | B1 | * | 12/2003 | Sato ...................... 439/331 |

FOREIGN PATENT DOCUMENTS

| EP | 0 871 262 A | 10/1998 |
| EP | 0 947 944 A2 | 10/1999 |
| JP | 61-174185 | 10/1986 |
| JP | 10-106674 | 4/1998 |
| JP | 10106674 | 4/1998 |
| JP | 11167968 | 6/1999 |
| JP | 11-297415 | 10/1999 |
| JP | 2000260537 | 9/2000 |

OTHER PUBLICATIONS

European Search Report dated Oct. 7, 2004.

* cited by examiner

*Primary Examiner*—Alexander Gilman
(74) *Attorney, Agent, or Firm*—Collard & Roe, P.C.

(57) ABSTRACT

In a connector for electrically connecting a mating object, a cover 12 is used for pressing the mating object against a contact 16 held by a housing 11. The cover is held on the housing 11 to be rotatable in a first direction and to be movable in a second direction intersecting the first direction. The cover is kept in a connected state by locking portions 14 and 21 which are engaged with each other in a direction opposite to the first direction and in the second direction. Upon disconnection of the mating object, the cover is rotated in the first direction to release the engagement of the locking portions and is moved in the second direction, thereby allowing the mating object to be disconnected.

9 Claims, 8 Drawing Sheets

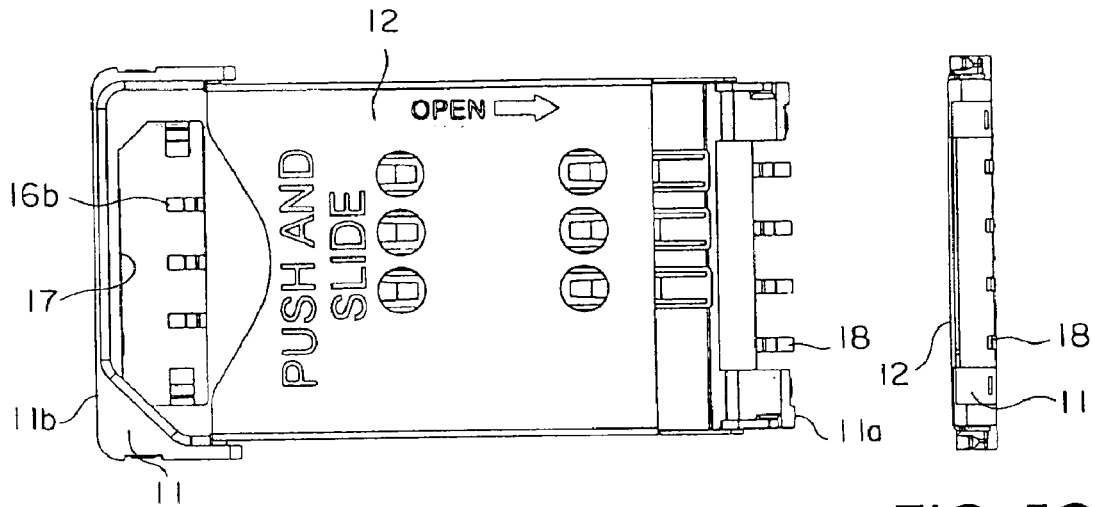
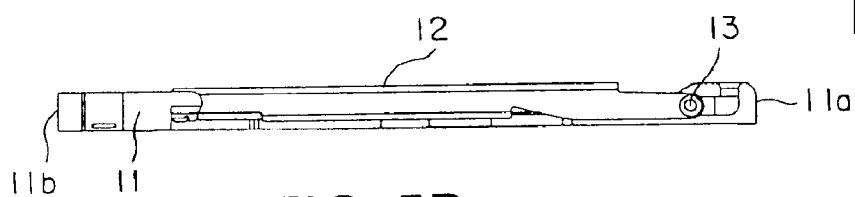
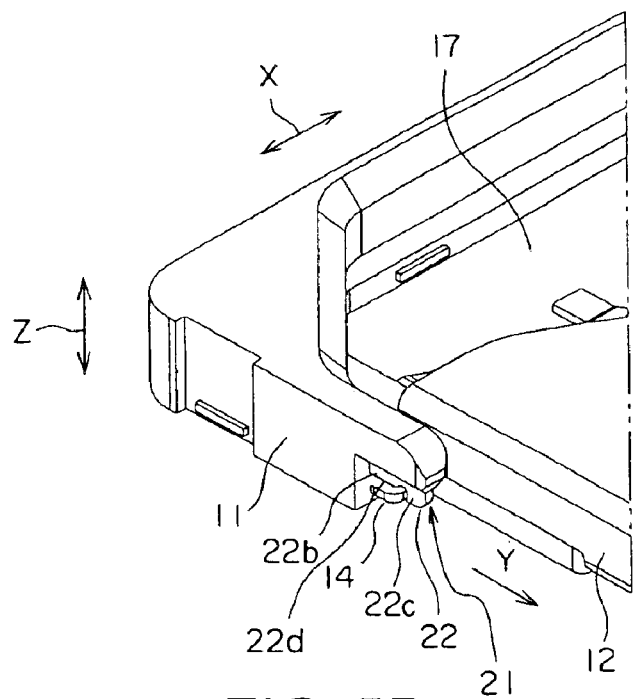

THIN-PROFILE CONNECTOR HAVING A COVER WHICH CAN BE READILY OPERATED AND RELIABLY LOCKED IN A CLOSED STATE

This invention claims priority to prior Japanese patent application JP 2002-269675, the disclosure of which is incorporated herein by reference.

BACKGROUND OF THE INVENTION

The present invention relates to a connector for use in connecting a small-sized thin-profile card, such as an IC card.

Recently, an IC card is remarkably wide spread. Even a small-sized apparatus, such as a mobile telephone, which can always be carried by a user is provided with a connector for connecting the IC card. The connector of the type is required to have a thin profile and to have a function of protecting the IC card.

In order to meet the above-mentioned requirement, proposal is made of a connector comprising a housing fixedly holding a contact, and an openable/closable cover for pressing a mating object to be connected against the contact to establish electrical connection. In the above-mentioned connector, the IC card is inserted and removed while the cover is opened. After completion of insertion or removal of the IC card, the cover is closed and a part of the cover is engaged with the housing to be locked.

As the connector of the type, there is known a connector which essentially requires the cover to be moved, sliding along the housing in order to unlock the cover (see Japanese Unexamined Patent Publications Nos. H10-106674, H11-167968, and 2000-260537). In the connector of this type, the cover is not unlocked unless the cover is slid along the housing. Therefore, during normal use, it is unlikely that the cover is unintentionally and erroneously opened.

In particular, the connector disclosed in Japanese Unexamined Patent Publication No. H10-106674 has a metallic cover in order to achieve a thin profile. In order to hold the cover to be rotatable and slidable with respect to the housing, a long slot formed in the cover is engaged with a shaft portion formed on the housing.

The connector disclosed in Japanese Unexamined Patent Publication No. 2000-260537 also has a metallic cover in order to achieve a thin profile, like the connector disclosed in Japanese Unexamined Patent Publication No. H10-106674.

However, in each of the connectors disclosed in Japanese Unexamined Patent Publications Nos. H10-106674, H11-167968, and 2000-260537, the cover may slide along the housing to be unlocked and opened if the connector is subjected to strong mechanical shock, for example, when an apparatus equipped with the connector is dropped. In case where the cover is unintentionally and undesiredly opened, it is highly possible to cause instantaneous interruption or permanent interruption of a signal. The above-mentioned problem is difficult to solve merely by weak frictional engagement between the cover and the housing. On the contrary, if the frictional engagement is strong, it is difficult to perform an operation of opening the cover.

If the cover is provided with the long slot, the cover may be displaced from a proper position during rotation. In this event, one end of the cover may be butted against a substrate with the connector mounted thereto, thereby preventing smooth rotation of the cover. In order to avoid the above-mentioned problem, Japanese Unexamined Patent Publication No. H10-106674 adopts a structure in which the cover is allowed to rotate after an axis moves from its initial position to a rotatable position. In this structure, however, a thin profile can not be achieved because of protrusion of one end of the cover during rotation. In order to prevent the displacement of the axis during rotation, the long slot is divided into a circular part (rotating portion) and a rectangular part (sliding portion) in the above-mentioned publication. However, since the shaft portion is integrally formed with the housing made of resin susceptible to wear, the effect of such a two-part shape does not continue for a long time because of wear of the shaft portion.

According to Japanese Unexamined Patent Publication No. 2000-260537, the above-mentioned disadvantages of Japanese Unexamined Patent Publication No. H10-106674 are removed except the strength of the shaft portion. However, the shaft portion of the metallic cover is formed by an additional or separate piece. This results in an increase in number of parts. Therefore, even if the thin profile can be achieved, the cost will be increased. In case where the shaft made of resin is fixed to the metallic cover, the problem of wear is inevitable. Even if the shaft is configured into a special shape in order to control the operation of the cover, the effect of such a special shape does not continue for a long time, like in Japanese Unexamined Patent Publication No. H10-106674.

SUMMARY OF THE INVENTION

It is therefore an object of the present invention to provide a connector adapted for use in connecting a small-sized thin-profile card, which has a cover can be readily operated and reliably locked in a closed state thereof.

It is another object of the present invention to economically provide a connector which can easily be reduced in profile.

Other objects of the present invention will become clear as the description proceeds.

According to an aspect of this invention, there is provided a connector for electrically connecting a mating object. The connector comprises a conductive contact, a housing fixedly holding the contact, a cover connected to the housing for pressing the mating object against the contact to establish electrical connection between the mating object and the contact, and a locking portion connected to the housing and the cover for keeping the cover in a connected state in which the electrical connection is established. The cover is held on the housing to be rotatable in a first direction and to be movable in a second direction intersecting the first direction. The locking portion is engaged in a direction opposite to the first direction and in the second direction. Disconnection of the mating object being carried out by rotating the cover in the first direction to disengage the locking portion and by moving the cover in the second direction, thereby allowing the mating object to be disconnected.

BRIEF DESCRIPTION OF THE DRAWING

FIGS. 5A to 5D are a plan view, a front view, a right side view, and an enlarged perspective view of the connector in FIGS. 1 through 3 when the cover is closed;

DESCRIPTION OF THE PREFERRED EMBODIMENT

Figure 1:
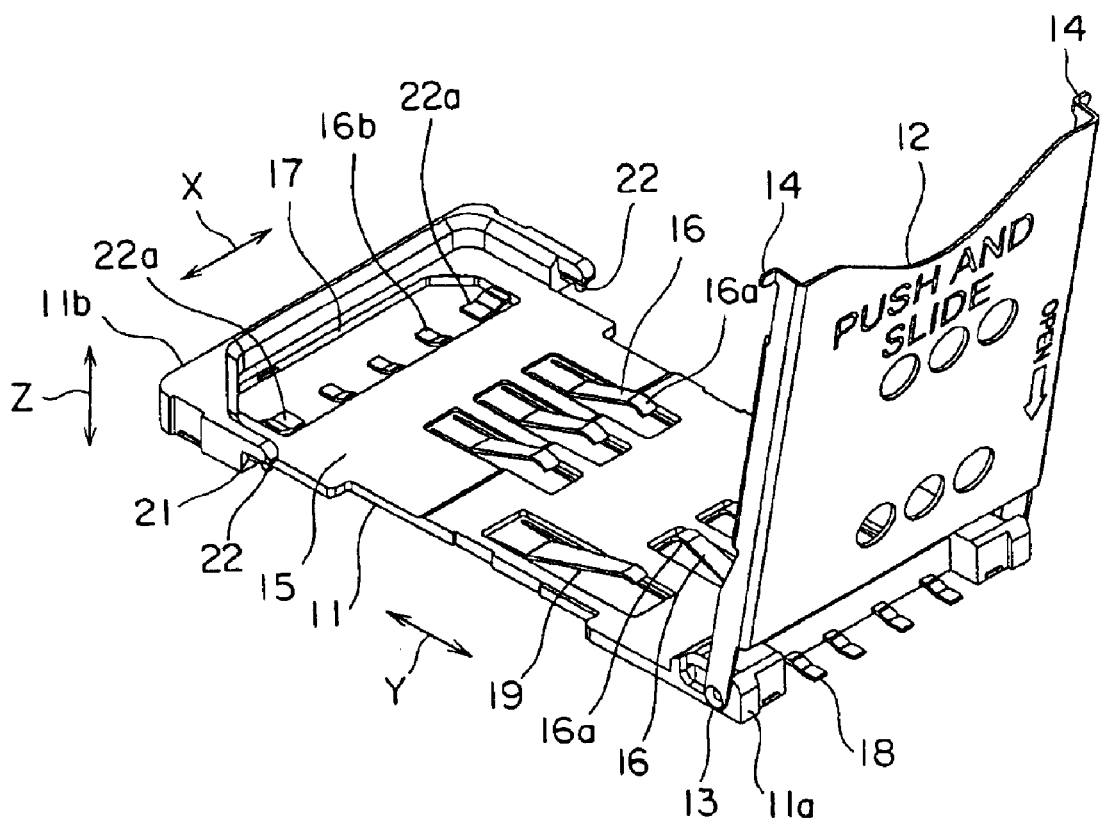
FIG. 1 is a perspective view of a connector according to an embodiment of this invention when a cover is opened.
Figure 2:
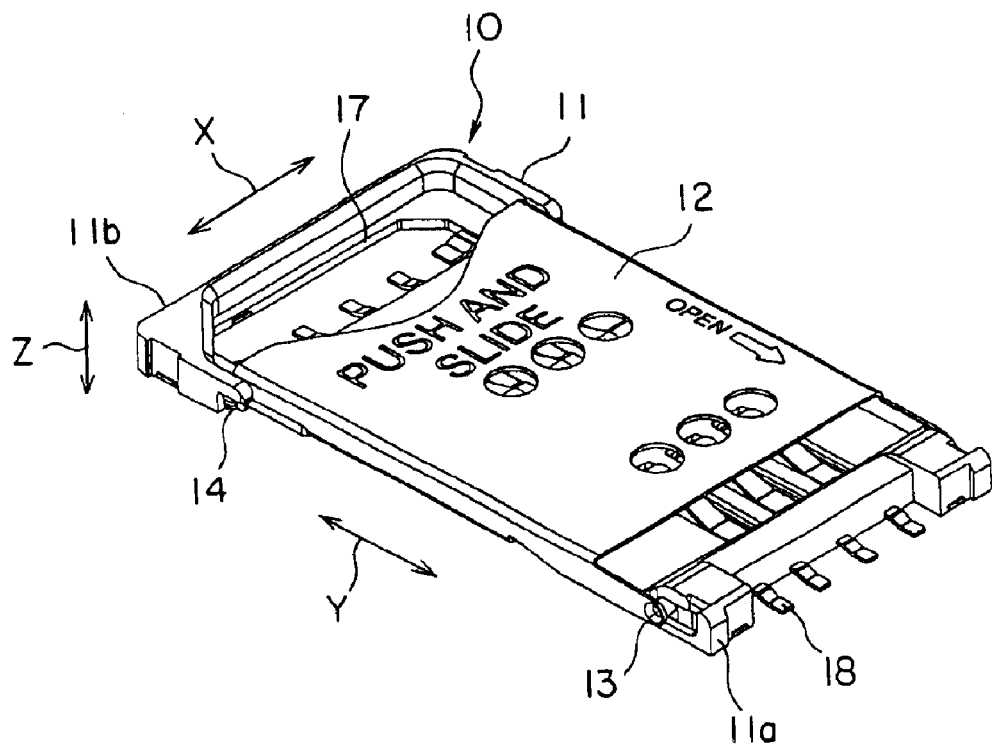
FIG. 2 is a perspective view of the connector in FIG. 1 when the cover is closed.
Figure 3:
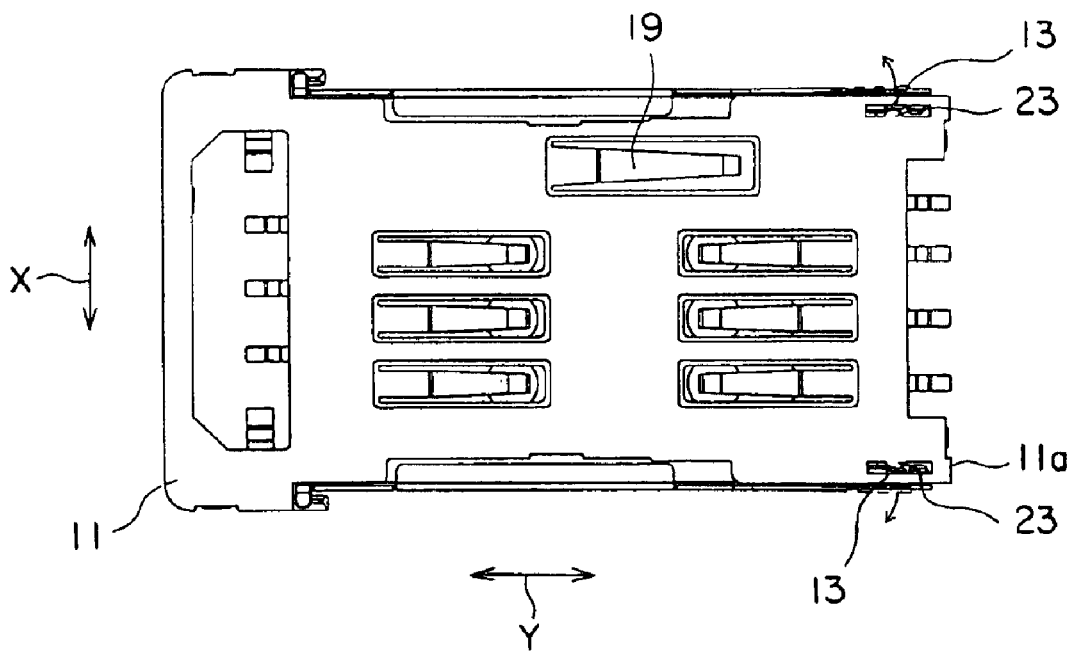
FIG. 3 is a bottom view of the connector illustrated in FIG. 2.

Referring to FIGS. 1 through 3, description will be made of a connector according to an embodiment of this invention.

The connector 10 illustrated in the figures serves to connect a so-called IC card as a small-sized thin-profile card to a small-sized apparatus, such as a mobile telephone, which can always be carried by a user. The connector 10 comprises a housing 11 made of an insulating material, and a metallic cover 12 made of a metal and coupled to the housing 11 so as to open and close an upper surface of the housing 11.

The cover 12 has a first and a second end portion opposite to each other and is provided with a pair of cover shaft portions 13 which are integrally formed on both sides of the first end portion and extends inward towards each other. The cover shaft portions 13 are coupled to one end 11a of the housing 11.

The cover shaft portions 13 are rotatable with respect to the housing 11 to make the cover 12 be closable in a first direction. Furthermore, the cover shaft portions 13 are movable along the housing 11 in a second direction Y. A pair of cover locking portions 14 is formed at the second end portion, i.e., a rotating end of the cover 12. The cover locking portions 14 are of a fingerlike shape bent outward. If the cover 12 is rotated from its a closed position at which the cover 12 is overlapped on the housing 11, the rotating end of the cover 12 is moved substantially in a direction Z, i.e., in a vertical direction.

The housing 11 has a housing thin portion 15. The housing thin portion 15 holds a plurality of conductive signal contacts 16. Each signal contact 16 has a contact-side contacting portion 16a having elasticity and protruding on an upper surface of a center area of the housing thin portion 15, and a contact soldering portion 16b located in an opening 17 near the other end 11b of the housing 11 and integrally formed with the contact-side contacting portion 16a. A reference numeral 18 represents a hold-down.

On at least one side of the housing thin portion 15, a cover holding spring 19 is held. The cover holding spring 19 serves as an elastic member for continuously urging the cover 12 in an opening direction.

The housing 11 is provided with a pair of housing locking portions 21 formed on both sides thereof near the other end 11b. The housing locking portions 21 serve as a cover holding portion for holding the cover 12. The housing locking portions 21 are made as parts of metallic locking plates 22, respectively, which are made of a metal and fixed to the housing 11. Other parts of the locking plates 22 are located in the opening portion 17 as plate soldering portions 22a each of which is for connecting the ground.

Particularly referring to FIG. 3, the housing 11 has a pair of housing protrusions 23 formed on both sides of the one end 11a and adapted to face the cover shaft portions 13 in a third direction X. The housing protrusions 23 serve as an obstacle to the movement of the cover shaft portions 13 in the direction Y. However, if the cover 12 is strongly pressed in the direction Y, the cover shaft portions 13 move over the housing protrusions 23 and the cover 12 is elastically deformed. As a result, the cover 12 is allowed to move in the direction Y. When the cover shaft portions 13 move over the housing protrusions 23, the housing protrusion and the shaft portion slide to each other to produce resistance force relative to movement of the shaft portion in the second direction. In other words, the cover shaft portions 13 and the housing protrusions 23 cooperate with each other to serve as a frictional locking arrangement for flexibly locking the cover 12 to the housing 11 in the direction Y by frictional engagement.

Figure 4:
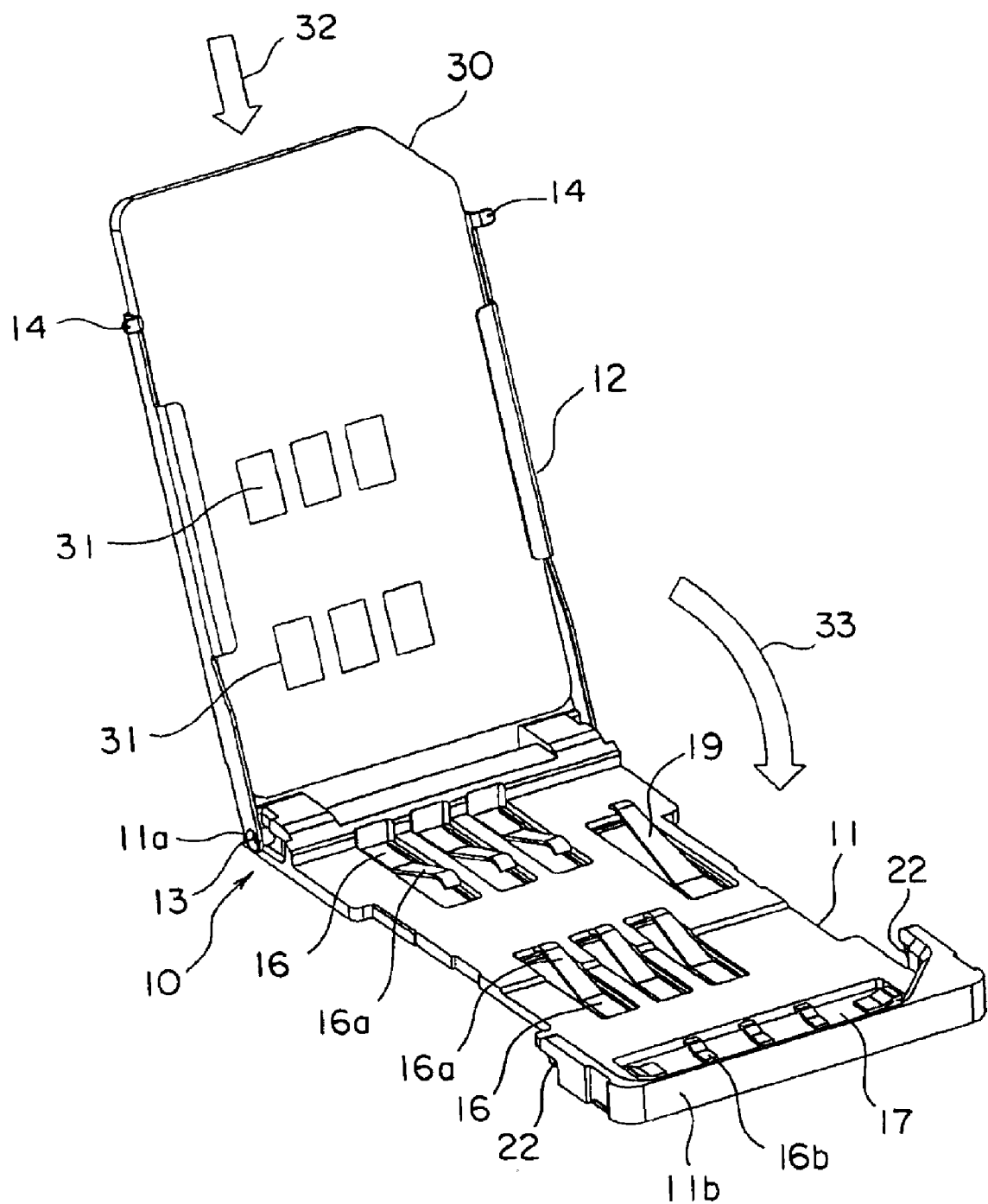
FIG. 4 is a perspective view of the connector illustrated in FIGS. 1 through 3 when the cover is opened and an IC cover is inserted into the connector.

Referring to FIG. 4 in addition, description will be made of an operation of connecting an IC card 30 as a mating object to the connector 10.

In FIG. 4, the IC card 30 has a plurality of card-side contacting portions 31 in one-to-one correspondence to the contact-side contacting portions 16a. Upon connection, the IC card 30 is inserted and fitted to the cover 12 in a direction depicted by an arrow 32. After the IC card 30 is fitted, the cover 12 is rotated as depicted by an arrow 33 to be overlapped onto the housing 11. At this time, the cover shaft portions 13 are located at a position nearest to the one end 11a of the housing 11.

After the cover 12 is overlapped to the housing 11, the cover 12 is pressed downward and forced to slide towards the other end 11b of the housing 11. Then, the card-side contacting portions 31 are brought into press contact with the contact-side contacting portions 16a and the cover locking portions 14 are inserted below the locking plates 22. When the downward pressing force is released in the above-mentioned state, the cover 12 is lifted up under restoring force of the cover holding spring 19. Thus, the IC card 30 is properly connected to the connector 10. When the cover 12 is forced to slide, appropriate click feeling is obtained by the action of the frictional locking arrangement.

In the state illustrated in FIGS. 5A to 5D where the cover 12 is closed, each of the cover locking portions 14 is engaged with a Z-direction engaging portion 22b of the locking plate 22 in the direction Z and with a Y-direction engaging portion 22c in the direction Y, irrespective of whether the IC card 30 is connected or not. The Z-direction and the Y-direction engaging portions 22b and 22c defines a recess portion 22d opened in the direction Z. The cover locking portion 14 is fitted to the recess portion 22d when engaged with the Z-direction engaging portion 22b. As a consequence, in the state where the cover 12 is closed, the cover locking portions 14 are locked to the locking plates 22 both in the direction Z and in the direction Y Thus, a mechanical locking arrangement formed by mechanical locking between the cover locking portions 14 and the housing locking portions 21 is put into a locked state. Therefore, the cover 12 is reliably locked in a closed state.

Even if the connector 10 is subjected to strong mechanical shock, for example, when the apparatus equipped with the connector 10 is dropped, the cover 12 is inhibited from being unintentionally opened.

Next referring to FIGS. 6A, 6B, 7A, 7B, 8, and 9, description will be made of operation of opening the cover 12.

Figure 6A:
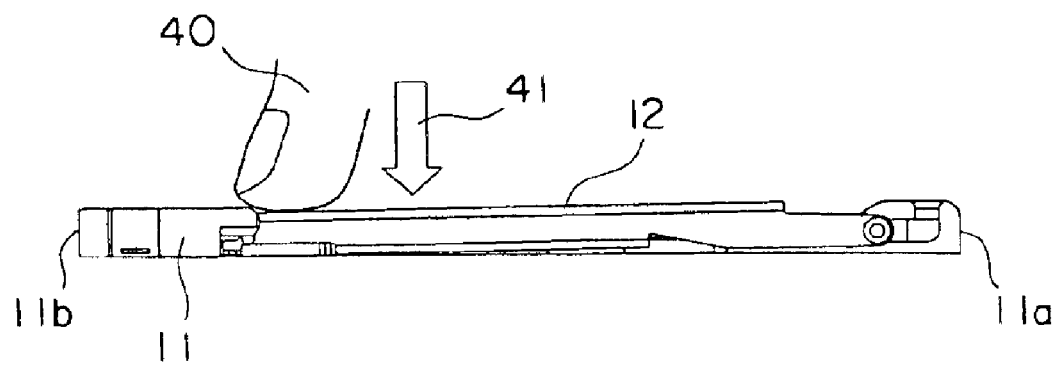
FIGS. 6A and 6B are a front view and an enlarged perspective view of the connector in FIGS. 1 through 3 for describing a first step of operation of opening the cover.
Figure 6B:
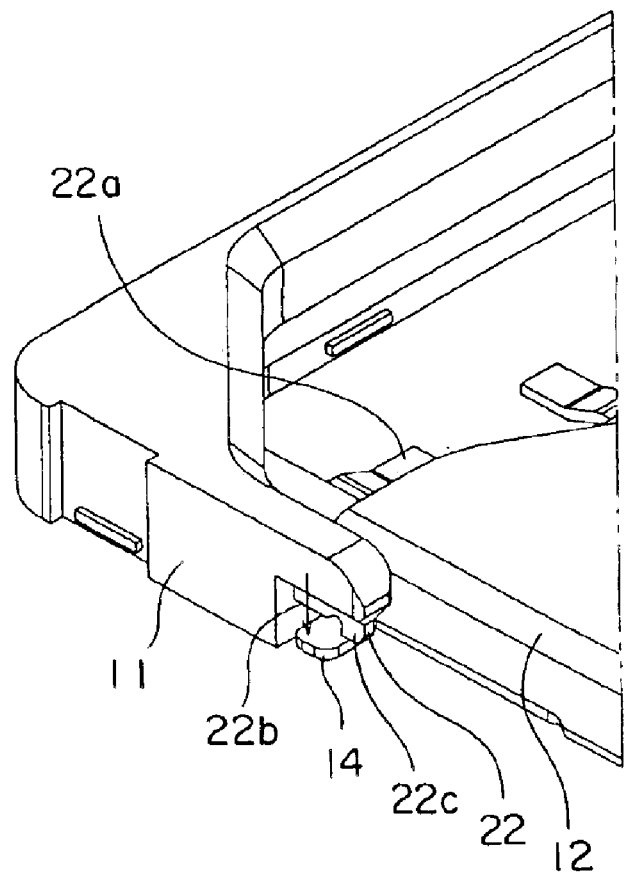

At first, as depicted by an arrow 41 in FIG. 6A, the cover 12 is pressed downward by a finger 40. Then, the cover 12 is slightly moved down and urges the cover holding spring 19. Therefore, the cover locking potions 14 are separated from the Z-direction engaging portions 22b of the locking plates 22.

Figure 7A:
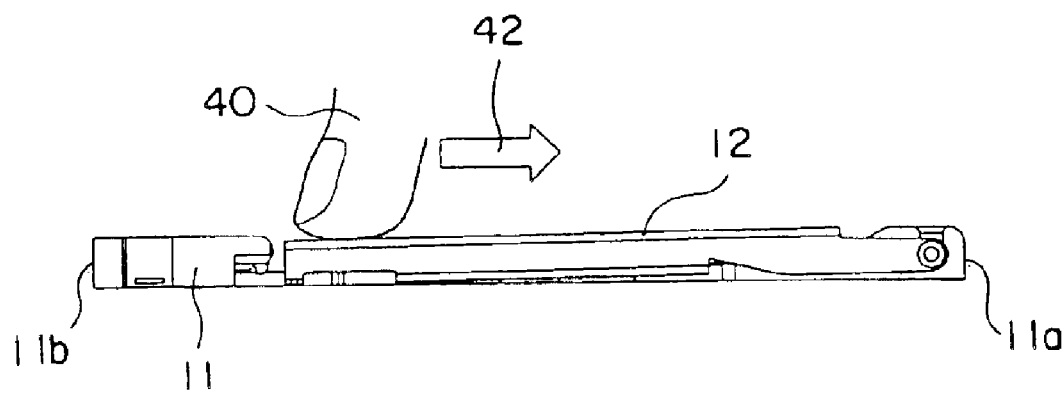
FIGS. 7A and 7B are a front view and an enlarged perspective view of the connector in FIGS. 1 through 3 for describing a second step of operation of opening the cover.
Figure 7B:
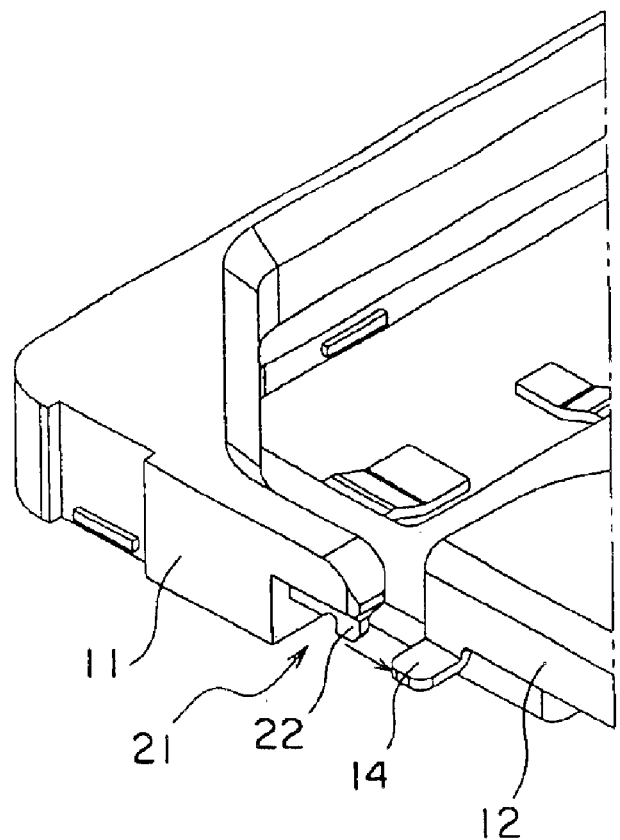

Next, as depicted by an arrow 42 in FIG. 7A, the cover 12 is pressed by the finger 40 towards the one end 11 a of the housing 11. Then, the cover 12 slides along the housing 11 and the cover locking portions 14 move over the locking plates 22 to be completely separated from the housing locking portions 21. In the above-mentioned state, the cover 12 is in a closed state but the cover locking portions 14 are unlocked both in the direction Z and in the direction Y. Thus, the locked state of the mechanical locking arrangement mentioned above is released. When the cover 12 is forced to slid, appropriate click feeling is obtained under the action of the frictional locking arrangement.

Figure 8:
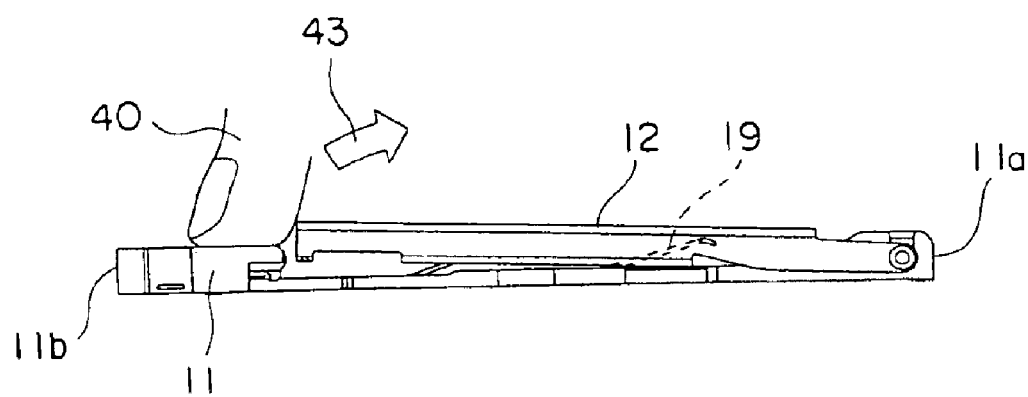
FIG. 8 is a front view of the connector in FIGS. 1 through 3 for describing a third step of operation of opening the cover.

When the locked state of the mechanical locking arrangement is released, the cover 12 is slightly lifted up under restoring force of the cover holding spring 19 as illustrated in FIG. 8. Then, by picking the rotating end of the cover 12 by the finger 40 and lifting the rotating end as depicted by an arrow 43, the cover 12 can easily be opened.

Figure 9:
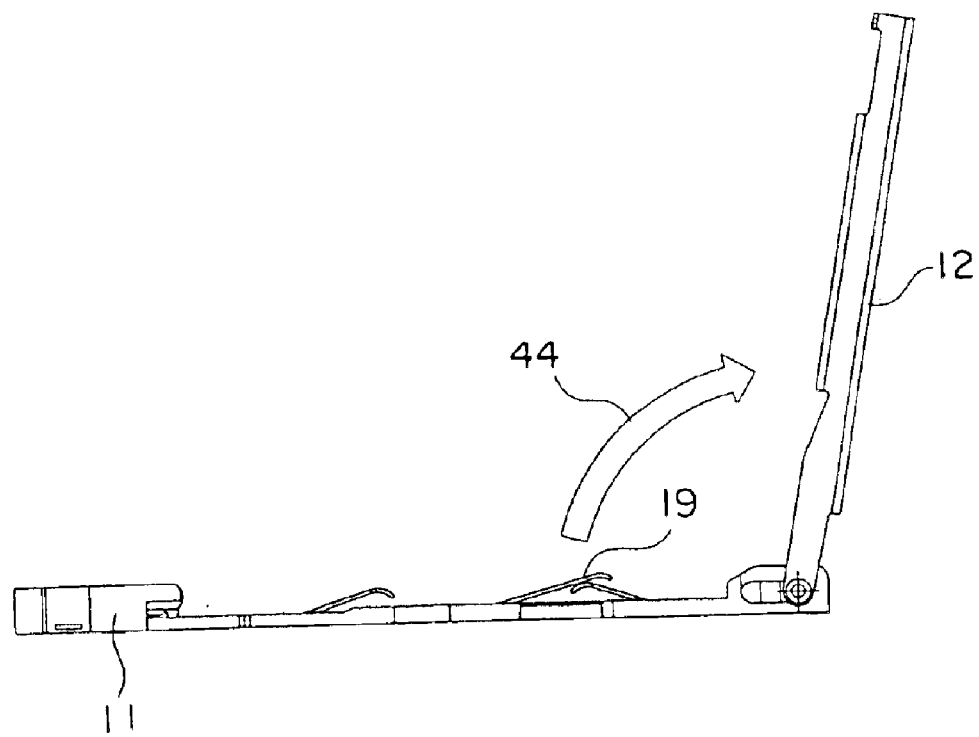
FIG. 9 is a front view of the connector in FIGS. 1 through 3 for describing a fourth step of operation of opening the cover.

As depicted by an arrow 44 in FIG. 9, the cover 12 is rotated and opened. Then, it is possible to insert the IC card 30 into the cover 12 as illustrated in FIG. 4 and to remove the IC card 30 therefrom.

Figure 10A:
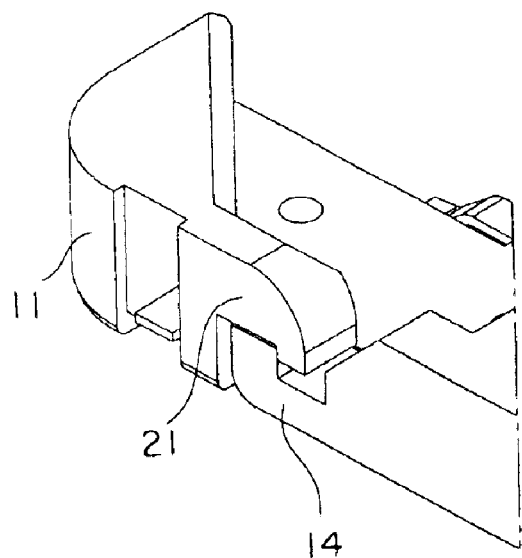
FIG. 10A is an enlarged perspective view of a modification of the connector in FIGS. 1 through 3 when the cover is closed.
Figure 10B:
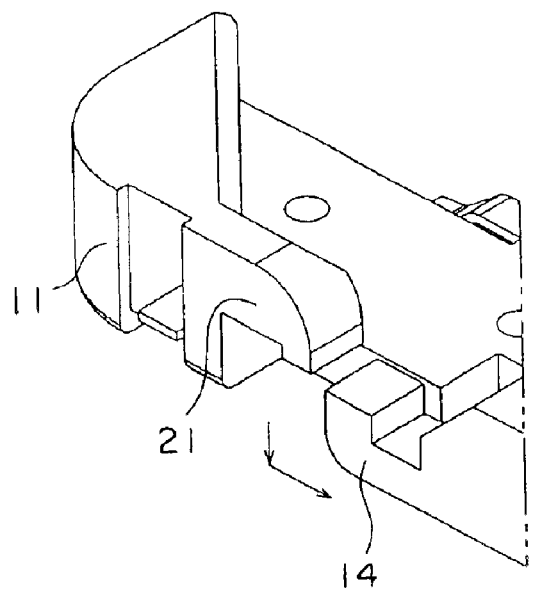
FIG. 10B is an enlarged perspective view of the modification in FIG. 10A when the cover is opened.

In the foregoing, description has been directed to a case where each of the cover locking portions 14 and the locking plates 22 is made of metal. Alternatively, as illustrated in FIGS. 10A and 10B, each of the cover locking portions 14 and the locking plates 22 may be made of an insulating substance such as resin. In FIGS. 10A and 10B also, similar parts are designated by like reference numerals.

What is claimed is:

1. A connector for electrically connecting a mating object, the connector comprising:
    a conductive contact;
    a housing fixedly holding the contact;
    a cover connected to the housing for pressing the mating object against the contact to establish electrical connection between the mating object and the contact;
    a locking mechanism connected to the housing and the cover for keeping the cover in a connected state in which the electrical connection is established, the locking mechanism comprising a housing locking mechanism coupled to the housing and a cover locking mechanism connected to the cover, the cover being held on the housing to be rotatable in a first direction and to be movable in a second direction intersecting the first direction, the housing locking mechanism and the cover locking mechanism being engaged in a direction opposite to the first direction and in the second direction, disconnection of the mating object being carried out by rotating the cover in the first direction to disengage the locking mechanism and by moving the cover in the second direction, thereby allowing the mating object to be disconnected; and
    a lock plate fixed to the housing, the lock plate being made of a metal material and having the housing locking mechanism and a ground-connecting portion for connecting the ground, the cover and the cover locking mechanism being made of a metal material.

2. The connector according to claim 1, further comprising an elastic member coupled between the housing and the cover for continuously urging the cover in the direction opposite to the first direction.

3. The connector according to claim 1, further comprising a frictional locking arrangement for flexibly locking the cover to the housing in the second direction by friction.

4. The connector according to claim 1, wherein the housing locking mechanism has a recess portion opened in the first direction, the cover locking mechanism being fitted to the recess portion when engaged with the housing locking mechanism.

5. The connector according to claim 4, wherein said housing locking mechanism has plural engaging portions for being engaged with the cover locking mechanism in directions different from one another, the engaging portions defining the recess portion.

6. The connector according to claim 1, wherein the cover has a first and a second end portion which are opposite to each other, the cover comprising a shaft portion formed integral with the first end portion of the cover and rotatably engaged with the housing.

7. The connector according to claim 6, wherein the locking mechanism being adapted to engage the second end portion of the cover with the housing in the direction opposite to the first direction and in the second direction.

8. The connector according to claim 6, wherein the shaft portion is movable along the housing in the second direction.

9. The connector according to claim 8, wherein the housing has a housing protrusion facing the cover shaft portions in a third direction perpendicular to the first and the second directions, the housing protrusion and the shaft portion being slidable to each other to produce resistance force relative to movement of the shaft portion in the second direction.

* * * * *